UNITED STATES PATENT OFFICE.

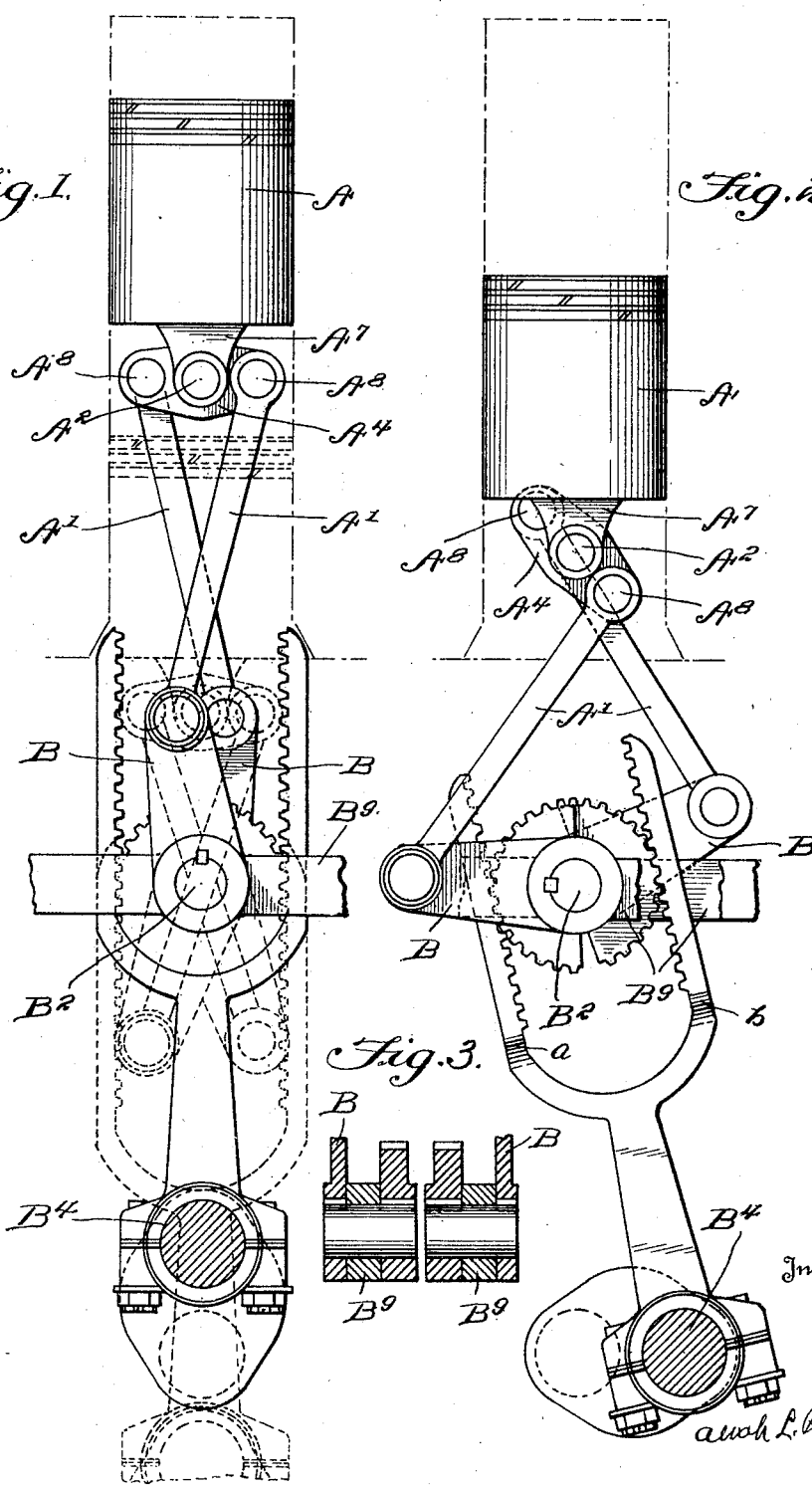

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,345.     Specification of Letters Patent.     Patented July 12, 1921.

Application filed December 8, 1920. Serial No. 429,179.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines, by which I secure a variation in the movement of the piston with reference to that of the crank, enabling me to gain advantages in the operation of such engines that are not possible with the constructions at present used. The particular form of the improvement shown in this application is a structural modification of my previous methods of applying a differentiating stroke means between the piston and crank, submitted in a series of applications for Letters Patent filed jointly with this, bearing Serial Numbers 429,168, 429,170 to 429,176, inclusive, and of the same date.

In the improvement shown herein I include a simple and effective means for compensating for variation in angle of the movement of the engine crank, with reference to the transmitting cranks and pinions.

In the annexed drawings—

Figure 1 is a vertical elevation of the working parts. The position of the mechanism at one hundred and eighty degrees of stroke is shown in dotted lines.

Fig. 2 is a view of the same parts at ninety degrees of stroke.

Fig. 3 is a sectional view of the pinion and crank supporting pins.

In Fig. 1, a piston A has lugs, $A^7$, projecting from its lower end. Only one of these lugs is given in the view. Through the lugs passes a pin, $A^2$. On this pin is mounted a bar, $A^4$, carrying pins or studs, $A^8$, $A^8$, on which are hung links, $A^1$, $A^1$, that connect with cranks, B, B. The cranks are mounted on pins (Fig. 3). These cranks are in the same horizontal and parallel positions, and are supported by bearings, $B^9$, preferably fastened to the engine frame. These bearing members are shown broken off. On the pins $B^2$ are mounted segmental pinions; the cranks B, B and the said pinions being keyed to the supporting pins, as shown. On a crank rod, $B^4$, is a yoked section, on which are cut teeth that mesh with those of the segmental pinions. The toothed sections of the yoke are properly spaced to engage the oppositely spaced pinions. I show this by the shading, $a$—$b$, Fig. 2.

It is evident that on the outstroke of piston A its motion will be transmitted to the pinions, through the links and cranks, while the pinions will, in turn, cause the crank rod to move, effecting a rotative action on the engine shaft. The pivoted bar $A^4$ will alter its movement to adjust itself to the swing of the links $A^1$, $A^1$. The toothed yoke will also vary its angle with reference to the pinions, but will maintain the proper tooth alinement.

What I believe is new and ask to have protected by Letters Patent, is—

In a differential transmission member the combination of supporting shafts, cranks on said shafts, segmental pinions rotatable with said cranks, a yoked connecting rod having racks meshing with the segmental pinions, pins in said cranks, a pivoted movable bar, a piston, a crank on a crank shaft, and means for attaching the yoked connecting rod to the said crank on said crank shaft, substantially as described.

In testimony whereof I affix my signature.

ALVAH L. POWELL.